US012719809B1

(12) United States Patent
Segal et al.

(10) Patent No.: US 12,719,809 B1
(45) Date of Patent: Aug. 25, 2026

(54) DRAINING ERRONEOUS PACKETS

(71) Applicant: Amazon Technologies, Inc., Seattle, WA (US)

(72) Inventors: Avigdor Segal, Netanya (IL); Barak Singer, Saratoga, CA (US); Jonathan Cohen, Hod Hasharon (IL); Anna Rom-Saksonov, Rosh Haayin (IL); Tomer Malach, Ramat Gan (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/975,278

(22) Filed: Dec. 10, 2024

(51) Int. Cl.
*G06F 15/16* (2006.01)
*H04L 47/32* (2022.01)
*H04L 49/00* (2022.01)

(52) U.S. Cl.
CPC .......... *H04L 47/32* (2013.01); *H04L 49/3063* (2013.01)

(58) Field of Classification Search
CPC ............................ H04L 47/32; H04L 49/3063
USPC .................................. 709/200–203, 217–238
See application file for complete search history.

(56) References Cited

U.S. PATENT DOCUMENTS 7,227,841 B2 * 6/2007 Mullendore ............ H04L 49/30 370/230
7,652,988 B2 * 1/2010 Jain ......................... H04L 47/10 370/395.4
8,170,045 B2 * 5/2012 Pan ......................... H04L 47/10 370/429
8,514,871 B2 * 8/2013 Anschutz ................ H04L 47/10 370/468
9,794,184 B2 * 10/2017 Sreeramoju ............. H04L 47/30
10,248,087 B2 * 4/2019 Hall ........................ H04L 41/22
10,262,700 B2 * 4/2019 Holbrook ................ H04L 47/30
10,491,611 B2 * 11/2019 Caldwell ............. H04L 63/0245
10,897,771 B2 * 1/2021 Hall ...................... H04W 72/30
11,528,227 B1 * 12/2022 Seely ...................... H04L 47/32
11,750,504 B2 * 9/2023 Hewson .............. G06F 13/1642 370/413
11,888,865 B2 * 1/2024 Caldwell ............... H04L 63/029
11,916,782 B2 * 2/2024 Beecroft ............. G06F 13/1642
2003/0223370 A1 * 12/2003 Jain ......................... H04L 47/10 370/395.43
2008/0019371 A1 * 1/2008 Anschutz ................ H04L 47/31 370/394
2013/0163417 A1 * 6/2013 Gupta ................. H04L 63/1458 370/230
2017/0118130 A1 * 4/2017 Sreeramoju ............. H04L 47/32
2017/0201537 A1 * 7/2017 Caldwell ............. H04L 63/1416
2018/0012633 A1 * 1/2018 Holbrook ................ H04L 47/30
(Continued)

*Primary Examiner* — Moustafa M Meky
(74) *Attorney, Agent, or Firm* — Weaver Austin Villeneuve & Sampson LLP

(57) ABSTRACT

An integrated circuit (IC) unit receives an ingress stream of packets for processing, and detects an error in a packet received in the ingress stream. An interrupt controller generates an internal drain indicator to trigger handling of the error internally by the IC unit. In in response to the internal drain indicator, the IC unit blocks the ingress stream to stop receiving new packets. The IC unit marks each of the packets being processed by the IC unit as erroneous, and drains the marked packets to prevent the error from propagating to a neighboring IC unit. The IC unit unblocks the ingress stream to continue receiving additional packets upon draining the marked packets.

20 Claims, 5 Drawing Sheets

(56) References Cited

U.S. PATENT DOCUMENTS

2019/0018376 A1* 1/2019 Hall .................... H04L 12/2803
2019/0045519 A1* 2/2019 Hall ....................... H04B 1/715
2020/0092312 A1* 3/2020 Caldwell ............. H04L 63/0236

* cited by examiner

DRAINING ERRONEOUS PACKETS

BACKGROUND

Some computing devices may include a plurality of integrated circuit (IC) pipeline stages for processing transactions. A communication device may be an example of a computing device that is generally used to facilitate data transfer among different devices on a network by transmitting or receiving packets for different applications. However, various errors may occur due to electrical, mechanical, or environmental factors that may cause data loss or data corruption, and impact the flow of data across the devices on the network resulting in a degraded system performance, and, therefore, poor user experience.

BRIEF DESCRIPTION OF THE DRAWINGS

Various embodiments in accordance with the present disclosure will be described with reference to the drawings, in which.

DETAILED DESCRIPTION

Figure 1:
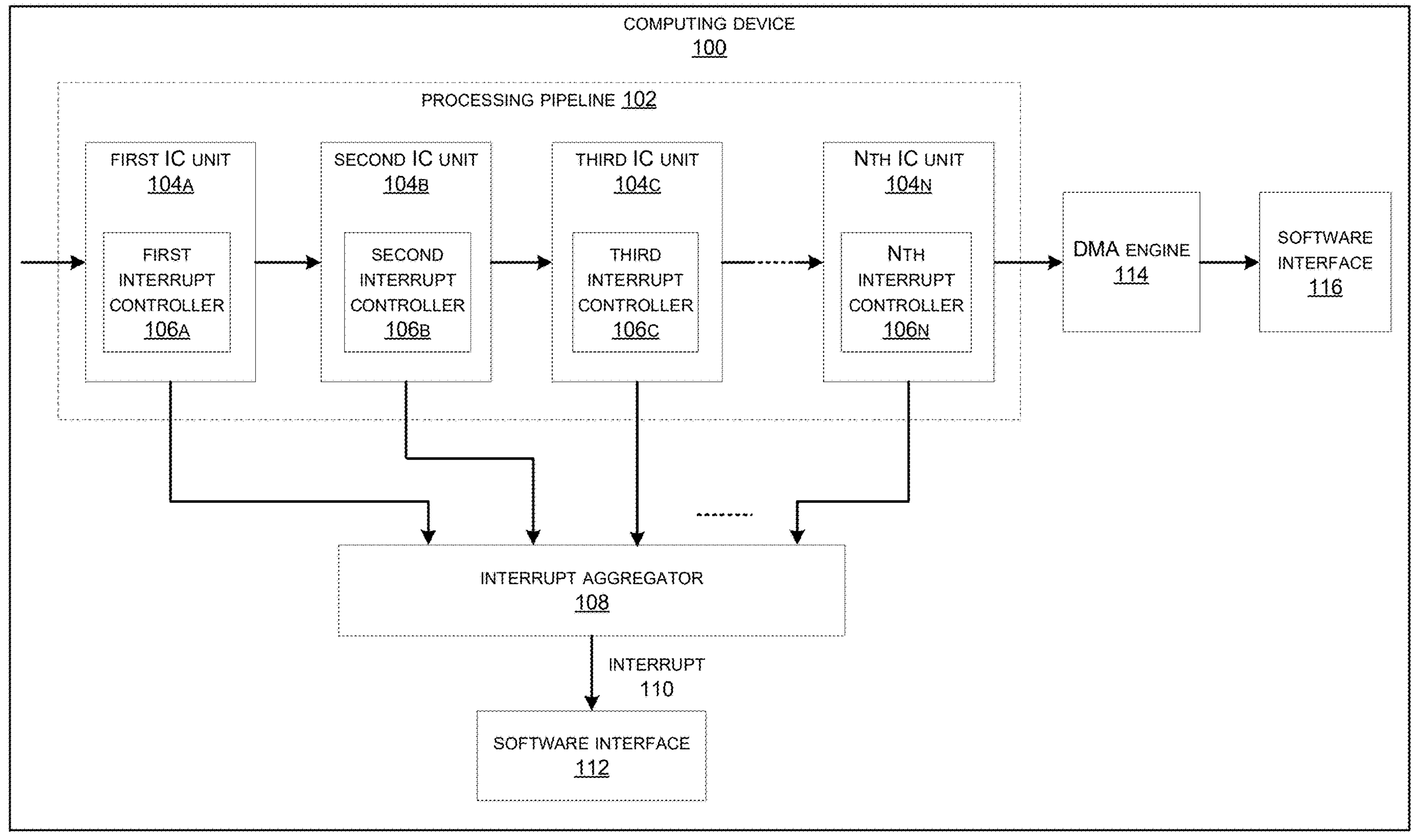
FIG. 1 illustrates an example of a computing device comprising a processing pipeline of integrated circuit (IC) units operable to process a stream of packets for transferring over a network.

Some computing devices may include a processing pipeline of integrated circuit (IC) units to process transactions for various applications. A communication device is an example of a computing device that may generally include one or more processors, memory, interconnects, direct memory access (DMA) engines, etc., to facilitate data transfer between different devices on a network using any transaction type (e.g., packets). An example communication device may include a network adapter device (e.g., an Ethernet controller) which may be used to transfer packets between a source device and a destination device over the network. The network adapter devices may be used in server computers to transfer network packets for various applications, such as, artificial intelligence, high performance computing, web hosting, gaming, video processing, among others.

In some implementations, the computing device may include a transmission (TX) path and a reception (RX) path for transmitting and receiving packets, respectively. Each of the TX path and the RX path may include a corresponding processing pipeline which may be partitioned into a plurality of IC units based on the functionality supported by each IC unit. For example, the plurality of IC units may be operable to perform metadata extraction, preprocessing, encryption/decryption, compression/decompression, CRC/checksum calculations or validations, data placement, etc. Each IC unit may include an interrupt controller that may be operable to generate an interrupt upon detection of an error in the IC unit. The interrupt from each IC unit may be sent to an interrupt aggregator that may notify a software interface to handle the interrupt based on the type and severity of the interrupt.

In some cases, data transfer through the computing device may be impacted due to hardware errors or faults in one of the IC units caused by various electrical, mechanical, or environmental factors. The hardware errors may cause bit-flips, or failed parity/ECC checks for memory read operations or data busses, resulting in data loss or data corruption. Various mechanisms for error detection and correction using suitable algorithms may be implemented in the computing device. In some implementations, once an error is detected, an interrupt may be generated to notify the software that an error has occurred, which may perform appropriate actions to handle the interrupt and resolve the error.

Generally, the computing device hardware may not have any mechanism to recover from some hardware errors. In such cases, the device hardware may stop transmitting packets from the IC unit responsible for causing the error, and wait for the software to reset that IC unit/function. This approach may be simple to implement, however; it may require software intervention to reset and reconfigure the computing device in order to resume the traffic. Furthermore, the reset process may be visible to the user. Since the reset domain generally involves a large number of IC units, or all of the IC units in the processing pipeline, no packets may be transferred while the device hardware is in the reset state, which may impact the system performance.

Techniques described herein provide a scalable solution that can be used to minimize user visible noise caused by hardware errors by isolating the IC unit where the error has occurred to minimize the impact on other IC units in the processing pipeline. When an error is detected in the IC unit, the interrupt controller may trigger an internal drain process to handle the error internally in the IC unit, and generate a low priority interrupt to the software to prevent a system abort and reset. The ingress stream may be blocked so that the new packets entering the IC unit do not become suspect. The packets that are being processed by the IC unit may be marked to indicate that the packets are potentially erroneous or may be responsible for causing the error in the current IC unit. The marked packets may be dropped or propagated to a next IC unit on an egress stream. Once the marked packets have exited or dropped, the ingress stream can be unblocked so that the IC unit can continue receiving and processing new packets, and the normal operation of the IC unit can resume. The next IC unit can either drop the marked packets or propagate the marked packets to the next IC unit in the processing pipeline based on the configuration.

Thus, handling the error internally in the IC unit can avoid system abort and re-initialization via the interrupt, and, therefore, minimize the user visible noise upon occurrence of the error. Furthermore, isolating the IC unit having the error may only impact the packets inside the IC units, and minimize the impact on other IC units and the data flow. The marked erroneous packets can be dropped by an IC unit in the processing pipeline based on the configuration of that IC unit, or can be propagated to the end of the processing pipeline for debug or logging purposes.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, wellknown features may be omitted or simplified in order not to obscure the embodiments being described.

FIG. 1 illustrates an example of a computing device 100 comprising a processing pipeline 102 of IC units operable to process a stream of packets. For example, the computing device 100 may be a network adapter device (e.g., an Ethernet controller) operable to transmit or receive network packets via a network. As an example, the computing device 100 may include functionality to support media access control (MAC) interface, physical coding sublayer (PCS) interface, physical (PHY) interface, and other suitable components to enable the transfer of network packets over the network. In some examples, the computing device 100 may be part of a server computer, and the computing device 100 may be used to transfer packets via the network for an application executing on the server computer. Note that some embodiments are described using a network adapter device that transmits or receives packets, but the techniques described herein can be applied to any computing device having pipeline stages of IC units for processing any type of packets (e.g., frames, transactions, messages, etc.).

An example of the computing device 100 may include separate processing pipelines for a transmission (TX) path and a reception (RX) path. For example, a TX processing pipeline may be operable to process network packets for transmitting over a network, and an RX processing pipeline may be operable to process network packets received over the network. The processing pipeline 102 described with reference to FIG. 1 can be an example of the TX processing pipeline or the RX processing pipeline. Note that the computing device 100 may include additional components (e.g., a processor, TX buffer, RX buffer, interconnects, physical ports, etc.) to support the intended functionality of the network adapter, which are not described with reference to FIG. 1. In some implementations, components of the computing device 100 may be connected using one or more interconnects based on any suitable bus protocol, e.g., Advanced eXtensible Interface (AXI), Advanced Peripheral Bus (APB), etc. The computing device 100 may be implemented using a system-on-a-chip (SoC) or other suitable ICs.

In some implementations, the processing pipeline 102 may be partitioned into a plurality of IC units based on the functionality supported by each IC unit, and/or to simplify the physical design process of the computing device 100. As shown in FIG. 1, the example processing pipeline 102 may include N number of IC units including a first IC unit 104*a*, a second IC unit 104*b*, a third IC unit 104*c*, and an $N^{th}$ IC unit 104*n*. Each of the N IC units may perform a different function or aspect of packet processing. Each of the N IC units may be operable to receive an ingress stream of packets for processing from a preceding IC unit, and provide an egress stream of packets to a subsequent IC unit after processing the packets. In some implementations, a ready/valid protocol may be implemented to transfer the packets between the subsequent IC units in the processing pipeline 102. For example, the ready signal may be asserted by an IC unit to indicate that the IC unit is ready to accept the packets from the preceding IC unit on the ingress stream, and the valid signal may be asserted to indicate that the packets on the egress stream to the subsequent IC unit are carrying valid data.

As an example, for the TX path, the first IC unit 104*a* may receive an ingress stream of packets for an application executing on the server computer. The first IC unit 104*a* may be operable to process the packets (e.g., extract metadata or compute offsets) and send the processed packets on an egress stream to the second IC unit 104*b*. The second IC unit 104*b* may be operable to receive the packets from the first IC unit 104*a* on an ingress stream, process the packets (e.g., perform compression and/or encryption), and send the processed packets on an egress stream to the third IC unit 104*c*. The third IC unit 104*c* may be operable to receive the packets from the second IC unit 104*b* on an ingress stream, process the packets (e.g., perform CRC/checksum calculations), and send the processed packets on an egress stream to a neighboring IC unit in the processing pipeline 102. The $N^{th}$ IC unit 104*n* may be operable to receive an ingress stream of packets from a preceding IC unit, process the packets (e.g., insert PHY connectivity), and send the processed packets on an egress stream to a DMA engine 114. The DMA engine 114 may be operable to communicate with a software interface 116 to transfer the packets that may be stored in the TX buffer to a remote device, e.g., using appropriate DMA descriptors configured by the software interface 116.

For the RX path, the first IC unit 104*a* may receive the ingress stream of packets via the network, process the packets (e.g., extract metadata) and send the processed packets on an egress stream to the second IC unit 104*b*. The second IC unit 104*b* may be operable to receive the packets from the first IC unit 104*a* on an ingress stream, process the packets (e.g., perform decryption and/or decompression), and send the processed packets on an egress stream to the third IC unit 104*c*. The third IC unit 104*c* may be operable to receive the packets from the second IC unit 104*b* on an ingress stream, process the packets (e.g., perform CRC/checksum validation), and send the processed packets on an egress stream to a neighboring IC unit in the processing pipeline 102. The Nth IC unit 104*n* may be operable to receive an ingress stream of packets from a preceding IC unit, process the packets (e.g., data placement), and send the processed packets on an egress stream to the DMA engine 114. The DMA engine 114 may be operable to communicate with the software interface 116 to transfer the packets that may be stored in the RX buffer to a memory in the server computer accessible by the application, e.g., using appropriate DMA descriptors configured by the software interface 116.

Each of the N IC units 104*a*-104*n* may include a respective interrupt controller. For example, the first IC unit 104*a* may include a first interrupt controller 106*a*, the second IC unit 104*b* may include a second interrupt controller 106*b*, the third IC unit 104*c* may include a third interrupt controller 106*c*, and the $N^{th}$ IC unit 104*n* may include an $N^{th}$ interrupt controller 106*n*. Each of the N IC units 104*a*-104*n* may be configured to detect a respective set of hardware errors based on the functionality implemented by the IC unit, and notify the corresponding interrupt controller of the error with corresponding internal error triggers.

The errors detected by the N IC units 104*a*-104*n* may be caused by electrical (hardware failure or bugs), mechanical (faulty or damaged interconnects) or environmental factors (overheating, temperature variations, radiation, etc.). Some errors may result in data corruption (e.g., bit-flip), or data loss. Each of the N IC units 104*a*-104*n* may include error detection and bit-flip detection mechanism to detect errors. As an example, ECC or parity checks can be performed on the memory read operations, and data buses to detect the errors. Some of the errors may be non-persistent or recoverable, and can be corrected without resetting of the hardware.

Each of the N interrupt controllers 104*a*-104*n* may be operable to send a corresponding interrupt to an interrupt aggregator 108 upon receiving the internal error triggers. Each of the N interrupt controllers 106*a*-106*n* may be configured to disable, enable, or mask the interrupt. The interrupt controllers 106*a*-106*n* may also be configured with priority or severity levels of each interrupt. The interrupt aggregator 108 may be configured to receive the interrupts from the N interrupt controllers 104*a*-104*n*, and send an interrupt 110 to a software interface 112 for error handling. As an example, the interrupt aggregator 108 may select an interrupt to be sent to the software interface 112 based on a priority level associated with the interrupt, and/or an arbitration algorithm.

Figure 2:
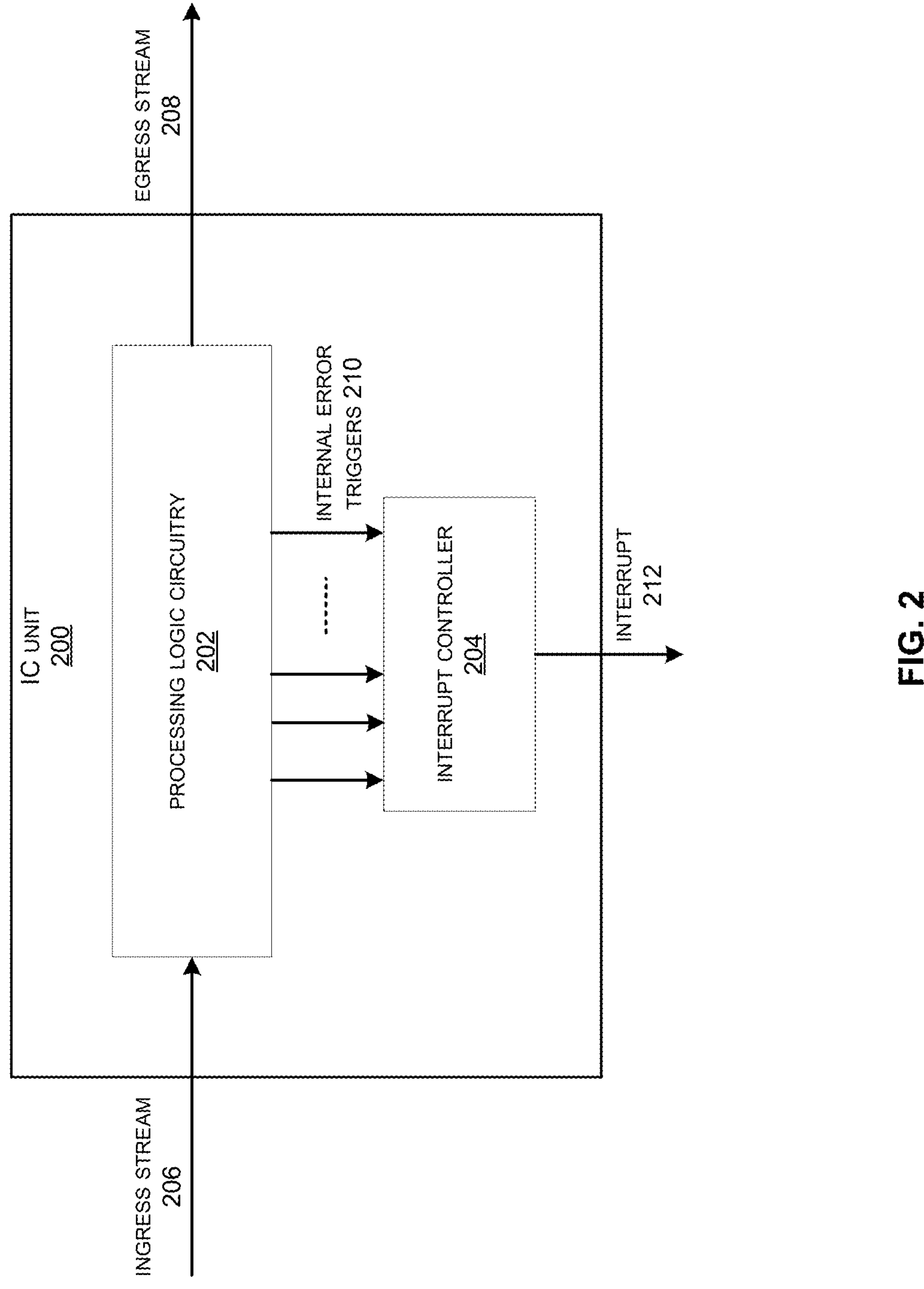
FIG. 2 illustrates an example of an IC unit operable to process an ingress stream of packets to provide an egress stream of packets.

FIG. 2 illustrates an example of an IC unit 200 operable to process an ingress stream of packets to provide an egress stream of packets. The IC unit 200 can be an example of the IC unit 104*a*, 104*b*, 104*c*, . . . , or 104*n*.

The IC unit 200 may be operable to receive packets in an ingress stream 206 from a preceding IC unit in the processing pipeline 102. The IC unit 200 may include processing logic circuitry 202 operable to process the packets in the ingress stream 206 based on the functionality supported by the IC unit 200, and provide processed packets on an egress stream 208 to a subsequent IC unit in the processing pipeline 102. For example, the processing logic circuitry 202 may be operable to process the packets in the ingress stream 206 to perform data encryption or decryption, as described with reference to FIG. 1.

The processing logic circuitry 202 may be further operable to generate one or more internal error triggers 210 upon detection of an error in a packet to an interrupt controller 204. For example, the packet may be in transit, or being processed by the processing logic circuitry 302. The internal error trigger 210 may indicate a type of the error (e.g., memory read error, buffer overflow error, etc.) detected by the IC unit 200. The interrupt controller 204 may be an example of the N interrupt controllers 106*a*-106*n*. The interrupt controller 204 may be operable to generate an interrupt 212 upon receiving the one or more internal error trigger 210, which may be sent to the interrupt aggregator 108. The interrupt aggregator 108 may notify the software interface 112 for error handling, as described above.

Referring back to FIG. 1, in some cases, when a fatal error is detected, the computing device hardware may not have a mechanism to recover from the error. Generally, the computing device 100 may stop transmitting packets or transactions, and wait for the software to reset the entire function in which the error had occurred. For example, the interrupt aggregator 108 may cause halting or aborting the operation of the computing device 100, which may result in a reset of the processing pipeline 102, and, in some cases, reconfiguration of the computing device 100. This error recovery process may be visible to the user due to the interruption in the service. However, in most cases, the errors may be non-persistent. A non-persistent error may be an error that is recoverable or is not permanent, e.g., a parity error. As an example, the parity error may occur from an unsuccessful memory read operation due to an incorrect read margin instead of a bit-flip, which may be correct in the next read operation. However, even in such cases, the processing pipeline 102 may be reset, and the computing device 100 may need to be re-initialized.

The techniques described herein can provide a scalable and low-cost solution to minimize the user visible noise caused by hardware errors, as described with reference to FIG. 3.

Figure 3:
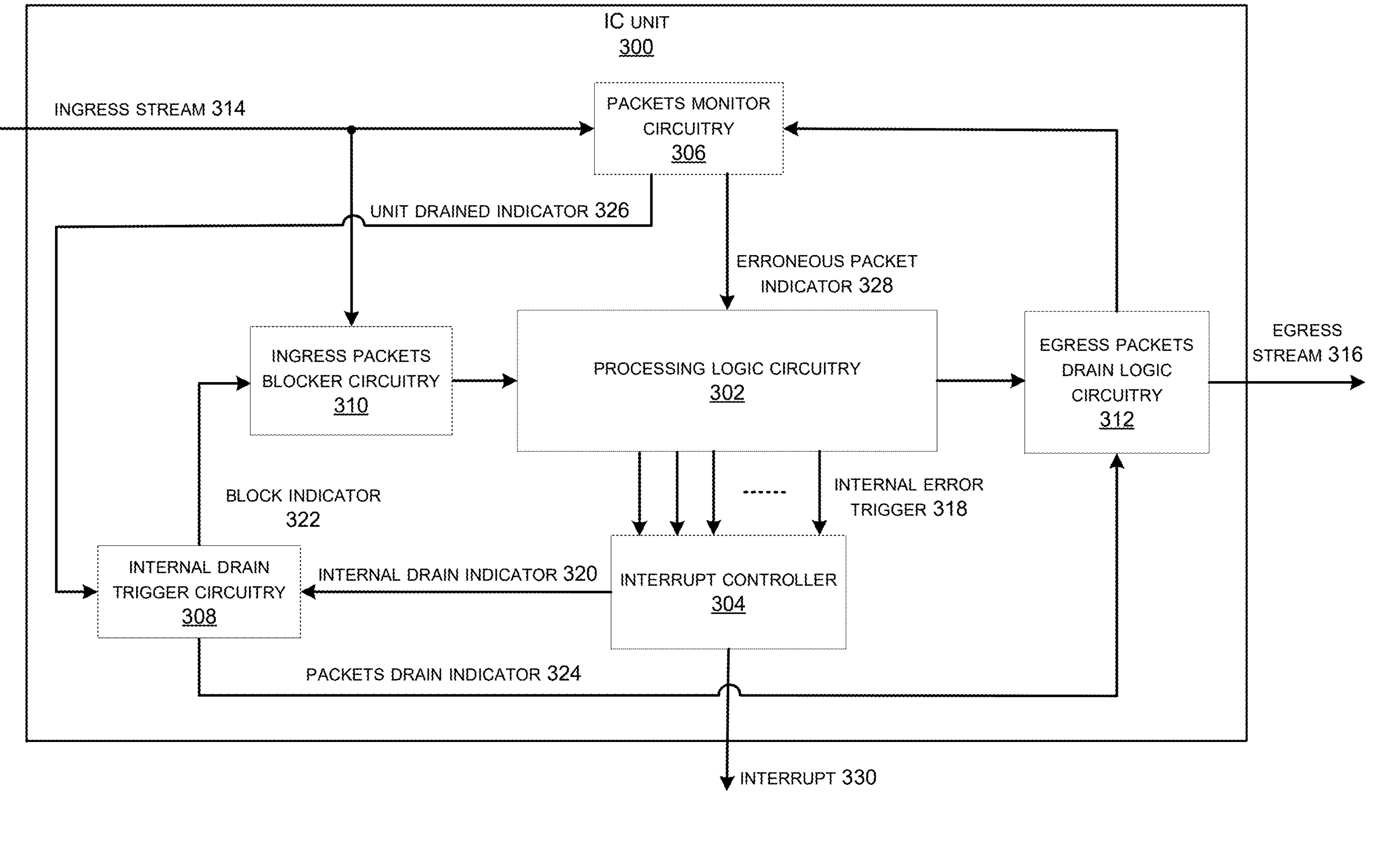
FIG. 3 illustrates an example of an IC unit operable to drain erroneous packets upon detection of an error in the IC unit, in accordance with some embodiments.

FIG. 3 illustrates an example of an IC unit 300 operable to drain erroneous packets upon detection of an error in the IC unit 300, in accordance with some embodiments. The IC unit 300 can be an example of one of the N IC units 104*a*-104*n* in the computing device 100 described with reference to FIG. 1.

The IC unit 300 may comprise processing logic circuitry 302, an interrupt controller 304, packets monitor circuitry 306, internal drain trigger circuitry 308, ingress packets blocker circuitry 310, and egress packets drain logic circuitry 312. The processing logic circuitry 302 may be similar to the processing logic circuitry 202. For example, the processing logic circuitry 302 may be operable to process the packets in an ingress stream 314 based on the functionality supported by the IC unit 300, and provide processed packets on an egress stream 316 to a subsequent IC unit in the processing pipeline 102. The processing logic circuitry 302 may be further operable to generate a corresponding internal error trigger 318 to an interrupt controller 304 to indicate that a packet is erroneous upon detection of an error from a plurality of errors the IC unit 300 is capable of detecting based on the functionality of the IC unit 300. For example, the processing logic circuitry 302 may include functionality to perform bit-flip detection and parity checks on contents of the packets.

The interrupt controller 304 may be an example of the interrupt controller 204, and may be configured to enable, disable, or mask the interrupt. The interrupt controller 304 may be operable to assert an internal drain indicator 320 to indicate handling of the error internally by the IC unit 300 upon receiving the internal error trigger 318. The interrupt controller 304 may be further operable to generate the corresponding interrupt with low priority or severity upon detection of the error to prevent the interrupt aggregator 108 from halting operation of the computing device 100. For example, the interrupt controller 304 may generate a low priority interrupt 330 to the interrupt aggregator 108 to provide relevant information about the error, which can enable the IC unit 300 to handle the error internally without the software interface 112 causing a reset of the IC unit 300, or the processing pipeline 102. The low priority interrupt 330 can be used by the software interface 112 for logging purposes.

The packets monitor circuitry 306 may be operable to count the packets internal to the IC unit 300. For example, the packets monitor circuitry 306 may track the number of packets being received in the ingress stream 314, and the number of packets being sent on the egress stream 316 to determine the count of packets that are being processed by the processing logic circuitry 302. When all the packets received in the ingress stream 314 have exited on the egress stream 316, or have been dropped by the IC unit 300, the packets monitor circuitry 306 may assert a unit drained indicator 326 indicating that the count of the packets internal to the IC unit 300 is zero.

The internal drain trigger circuitry 308 may be operable to assert a block indicator 322 to the ingress packets blocker circuitry 310 to block the ingress stream 314 based on the internal drain indicator 320 being asserted. The ingress packets blocker circuitry 310 may be operable to block the ingress stream 314 to stop receiving new packets based on the block indicator 322 being asserted. In some implementations, asserting the block indicator 322 may be used to de-assert a ready signal to a preceding unit sending the packets on the ingress stream 314 to indicate that the IC unit 300 is not ready to accept new packets. The internal drain trigger circuitry 308 may be further operable to generate a packet's drain indicator 324 to the egress packets drain logic circuitry 312 to drain the packets based on the internal drain indicator 320 being asserted.

The egress packets drain logic circuitry 312 may be operable to mark each of the packets being processed by the processing logic circuitry 302 to indicate that the packet is erroneous based on the packets drain indicator 324, and drain each of the marked packets. The egress packets drain logic circuitry 312 may be further operable to select between dropping the marked packets, and sending the marked packet on the egress stream 316 to a subsequent IC unit in the processing pipeline 102 based on a configuration specific to the IC unit 300. When all the marked packets have been drained, the internal drain trigger circuitry 308 may be further operable to de-assert the block indicator 322 to the ingress packets blocker circuitry 310 to un-block the ingress stream 314 based on the unit drained indicator 326 being asserted. The ingress packets blocker circuitry 310 may be further operable to unblock the ingress stream 314 to receive additional packets upon draining of the marked packets. For example, de-asserting the block indicator 322 may be used to assert the ready signal to indicate to the preceding IC unit that the IC unit 300 is now ready to accept the new packets. Thus, the IC unit 300 can resume the normal operation and continue processing the new packets.

In some cases, the IC unit 300 may receive erroneous packets in the ingress stream 314. For example, one of the preceding units in the processing pipeline 102 may have marked the packets as erroneous by modifying the metadata of the packets. The packets monitor circuitry 306 may be further operable to assert an erroneous packet indicator 328 to indicate erroneous packets in the ingress stream 314 based on the metadata of the erroneous packets. These erroneous packets are not processed by the processing logic circuitry 302 based on the erroneous packet indicator 328, and passed to the egress packets drain logic circuitry 312. The egress packets drain logic circuitry 312 may select, based on a configuration specific to the IC unit 300, between dropping the erroneous packets, and passing the erroneous packets to the subsequent IC unit in the processing pipeline 102 without processing the erroneous packets.

Thus, upon detecting the error, marking all the packets that are internal to the IC unit 300 as erroneous packets, and draining those erroneous packets can prevent propagating the error to the subsequent IC units in the processing pipeline 102. In some examples, the erroneous packets may be dropped, especially for non-persistent errors that may be recoverable, e.g., a parity error. The computing device 100 may be configured to support retransmission of packets. Thus, the IC unit 300 may receive the packets again in the ingress stream 314, and may be processed by the processing logic circuitry 302 without re-occurrence of the error. Therefore, limiting the error handling internally to the IC unit 300 may prevent resetting of the computing device 100, which can minimize interruption of the service, and, therefore, visibility to the user. In some rare cases, when the error is persistent after multiple attempts of retransmission of the packets, the interrupt controller 304 may send the interrupt 330 with a high priority to the interrupt aggregator 108 for handling by the software interface 112.

Various embodiments can allow configuring each of the N IC units 104_a_-104_n_ to drain the erroneous packets based on the functionality supported by each IC unit. In some examples, the erroneous packets may be dropped earlier in the processing pipeline 102 when the error is non-persistent, and the retransmission of the packets is supported. For example, a non-persistent parity error that caused the erroneous packets may not occur during the retransmission of the packets. In some examples, the erroneous packets may be propagated to the end of the processing pipeline 102 to be handled by the software interface 116 for debug and logging purposes, e.g., when the processing pipeline 102 is stuck.

Figure 4:
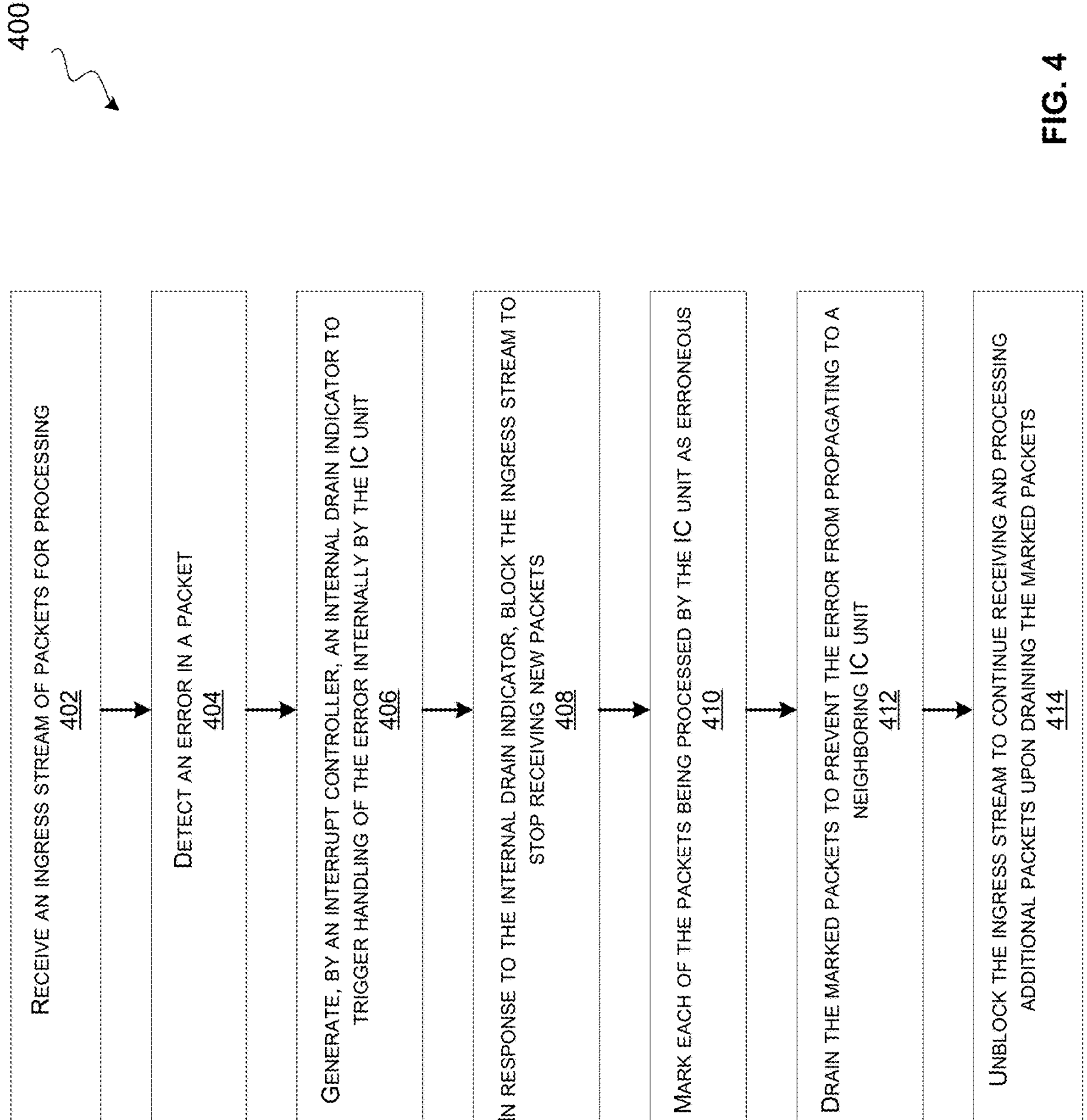
FIG. 4 illustrates an example of a flowchart for a method performed by an IC unit for draining erroneous packets, in accordance with some embodiments.

FIG. 4 illustrates an example of a flowchart 400 for a method performed by an IC unit for draining erroneous packets, in accordance with some embodiments. The IC unit can be an example of the IC unit 300 or one of the IC units 104_a_-104_n_, as described with reference to FIG. 1 and FIG. 3. For example, the IC unit can be the second IC unit 104_b_ in the processing pipeline 102.

In step 402, the method includes receiving an ingress stream of packets for processing. For example, the second IC unit 104_b_ may receive the ingress stream 314 of packets from the first IC unit 104_a_. As an example, the processing pipeline 102 may belong to a TX path for transmitting the packets over a network. The second IC unit 104_b_ may receive the packets in the ingress stream 314 for processing the packets by performing encryption on contents of the packets for transmission via the network.

In step 404, the method includes detecting an error in a packet. The processing logic circuitry 302 may detect an error in a packet received in the ingress stream 314, being processed by the processing logic circuitry 302, or in transit. For example, the error may be a parity bit error on an interconnect channel carrying the packet. The processing logic circuitry 302 may generate the internal error trigger 318 to the interrupt controller 304 upon detection of the error.

In step 406, the method includes generating, by an interrupt controller, an internal drain indicator to trigger handling of the error internally by the IC unit. The second interrupt controller 106_b_ of the second IC unit 104_b_ may generate the internal drain indicator 320 to trigger handling of the error internally by the second IC unit 104_b_. The second interrupt controller 106_b_ may also generate the interrupt 330 with a low priority to the interrupt aggregator 108 to prevent the interrupt aggregator 108 from halting operation of the computing device 100.

In step 408, the method includes blocking the ingress stream to stop receiving new packets in response to the internal drain indicator. The internal drain indicator 320 may be used by the internal drain trigger circuitry 308 to assert the block indicator 322, which may enable the ingress packets blocker circuitry 310 to block the ingress stream 314 to stop receiving new packets. For example, the second IC unit 104_b_ may de-assert the ready signal to the first IC unit 104_a_ indicating that the second IC unit 104_b_ is not ready to accept new packets.

In step 410, the method includes marking each of the packets being processed by the IC unit as erroneous. The internal drain indicator 320 may also be used by the internal drain trigger circuitry 308 to assert the packets drain indicator 324, which may enable the egress packets drain logic circuitry 312 to mark each of the packets as erroneous by modifying the corresponding metadata of each packet.

In step 412, the method includes draining the marked packets to prevent the error from propagating to a neighboring IC unit. The egress packets drain logic circuitry 312 may further drain the marked packets either by dropping the marked packets, or propagating the marked packets to the third IC unit 104_c_ in the processing pipeline 102 based on a configuration specific to the second IC unit 104_b_. The third IC unit 104_c_ may drop the erroneous packets received from the second IC unit 104_b_, or propagate the erroneous packets to the next IC unit without processing the erroneous packets based on a configuration specific to the third IC unit 104*c*.

In step 414, the method includes unblocking the ingress stream to continue receiving and processing additional packets upon draining the marked packets. The packets monitor circuitry 306 may assert the unit drained indicator 326 when all the erroneous packets have been drained, which may enable the internal drain trigger circuitry 308 to de-assert the block indicator 322. The ingress packets blocker circuitry 310 may unblock the ingress stream 314 to resume the normal operation, and continue receiving and processing additional packets from the first IC unit 104*a* upon de-asserting of the block indicator 322. For example, the second IC unit 104*b* may assert the ready signal again to the first IC unit 104*a* indicating that the second IC unit 104*b* is now ready to accept new packets.

Thus, the techniques described herein can provide a scalable low-cost solution to significantly reduce user visible noise caused by hardware errors by handling the error internally in the IC unit where the error was detected. Furthermore, isolating the IC unit having the error may only impact the packets inside the IC unit, and minimize the impact on other IC units and the data flow. Non-persistent errors may not require a reset and re-initialization of the computing device, which can prevent interruptions in the service and improve the system performance.

Figure 5:
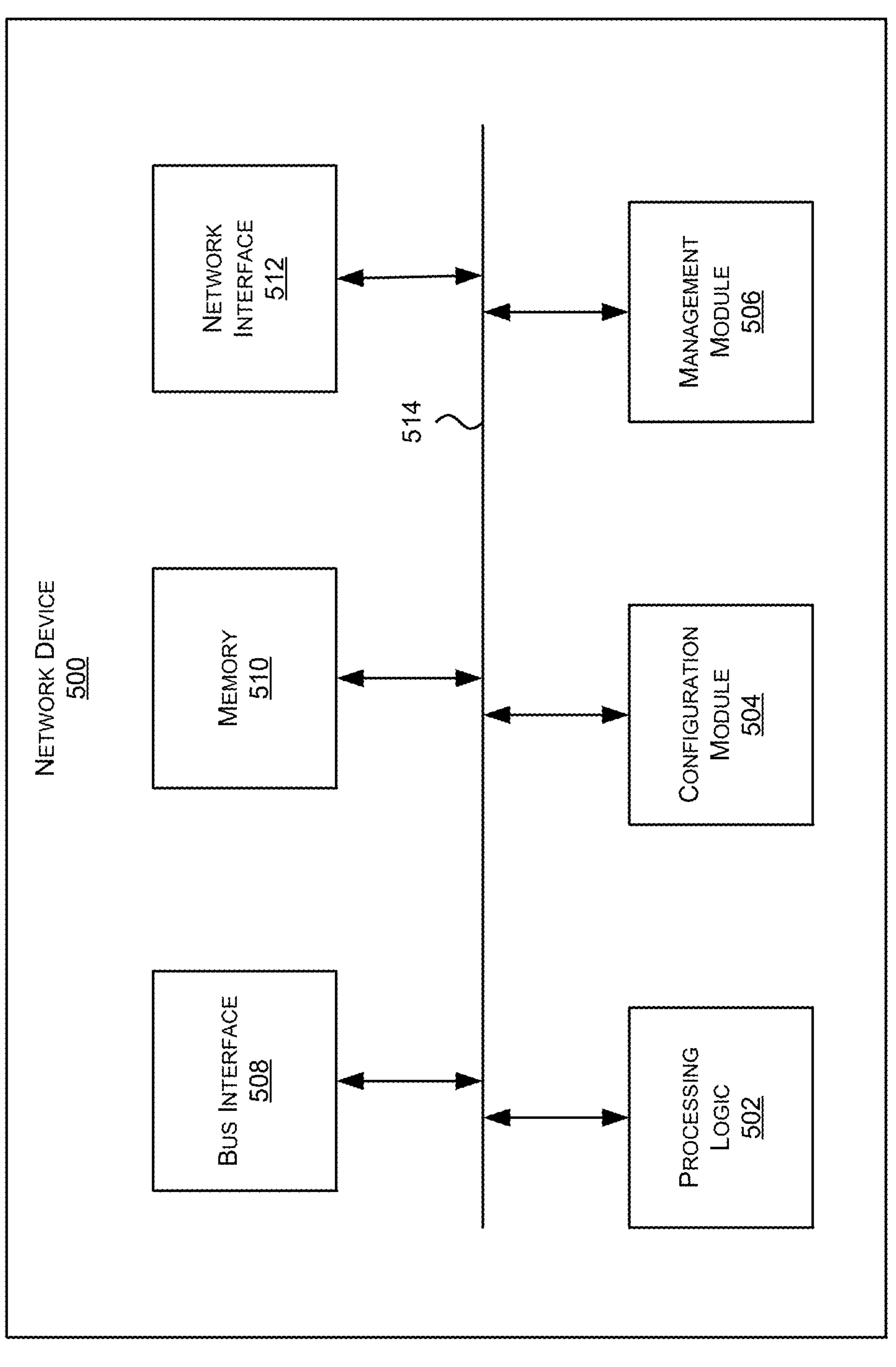
FIG. 5 illustrates an example of a network device, according to certain aspects of the disclosure.

FIG. 5 illustrates an example of a network device 500. Functionality and/or several components of the network device 500 may be used without limitation with other embodiments disclosed elsewhere in this disclosure, without limitations. For example, the computing device 100 may be an example of the network device 500. A network device 500 may facilitate processing of packets and/or forwarding of packets from the network device 500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 500 may be the recipient and/or generator of packets. In some implementations, the network device 500 may modify the contents of the packet before forwarding the packet to another device. The network device 500 may be a peripheral device coupled to another computer device, a switch, a router or any other suitable device enabled for receiving and forwarding packets.

In one example, the network device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The network device 500 may include additional modules, which are not illustrated here. In some implementations, the network device 500 may include fewer modules. In some implementations, one or more of the modules may be combined into one module. One or more of the modules may be in communication with each other over a communication channel 514. The communication channel 514 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the network device 500, while in other cases some or all of the memory may be external to the network device 500. The memory 510 may store an operating system comprising executable instructions that, when executed by the processing logic 502, provides the execution environment for executing instructions providing networking functionality for the network device 500. The memory may also store and maintain several data structures and routing tables for facilitating the functionality of the network device 500.

In some implementations, the configuration module 504 may include one or more configuration registers. Configuration registers may control the operations of the network device 500. In some implementations, one or more bits in the configuration register can represent certain capabilities of the network device 500. Configuration registers may be programmed by instructions executing in the processing logic 502, and/or by an external entity, such as a host device, an operating system executing on a host device, and/or a remote device. The configuration module 504 may further include hardware and/or software that control the operations of the network device 500.

In some implementations, the management module 506 may be configured to manage different components of the network device 500. In some cases, the management module 506 may configure one or more bits in one or more configuration registers at power up, to enable or disable certain capabilities of the network device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the network device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 500 may include multiple network interface modules, each configured to communicate with a different network. For example, in these implementations, the network device 500 may include a network interface module for communicating with a wired Ethernet network, a wireless 802.11 network, a cellular network, an Infiniband network, etc.

The various components and modules of the network device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing device, comprising:
a processing pipeline comprising a plurality of integrated circuit (IC) units; and
an interrupt aggregator operable to receive interrupts generated by each of the plurality of IC units and notify a software interface for error handling,
wherein each of the plurality of IC units is operable to:
receive an ingress stream of packets for processing;
detect that a packet has a non-persistent error;
assert, by an interrupt controller, an internal drain indicator to indicate handling of the non-persistent error internally by the IC unit;
generate, by the interrupt controller, a low priority interrupt to the interrupt aggregator to prevent the interrupt aggregator from halting operation of the computing device;
block the ingress stream to stop receiving new packets based on the internal drain indicator being asserted;
mark each of the packets being processed by the IC unit as erroneous by modifying metadata of respective packets;
drain the marked packets by sending the marked packets on an egress stream to a subsequent IC unit in the processing pipeline; and
unblock the ingress stream to receive additional packets upon draining the marked packets, and resume normal operation of the IC unit.

2. The computing device of claim 1, wherein each of the plurality of IC units is further operable to:
determine that the packets in the ingress stream are marked as erroneous based on the metadata of the respective packets; and
select, based on a configuration specific to the IC unit, between dropping the erroneous packets, and passing the erroneous packets to the subsequent IC unit in the processing pipeline without processing the erroneous packets.

3. The computing device of claim 2, wherein a last IC unit in the processing pipeline drops the erroneous packets received in a corresponding ingress stream based on a configuration specific to the last IC unit.

4. The computing device of claim 1, wherein the computing device is an Ethernet controller, and wherein the processing pipeline belongs to a transmission path for transmitting the packets over a network.

5. A method performed by an integrated circuit (IC) unit, comprising:
receiving an ingress stream of packets for processing;
detecting an error in a packet;
generating, by an interrupt controller, an internal drain indicator to trigger handling of the error internally by the IC unit;
in response to the internal drain indicator, blocking the ingress stream to stop receiving new packets;
marking each of the packets being processed by the IC unit as erroneous;
draining the marked packets to prevent the error from propagating to a neighboring IC unit; and
unblocking the ingress stream to continue receiving and processing additional packets upon draining the marked packets.

6. The method of claim 5, wherein the error is a non-persistent error, and draining the marked packets includes dropping each of the marked packets.

7. The method of claim 5, wherein draining the marked packets includes sending each of the marked packets on an egress stream to the neighboring IC unit.

8. The method of claim 7, wherein the neighboring IC unit is configured to drop the marked packets received from the IC unit based on the marked packets being erroneous.

9. The method of claim 5, further comprising:
receiving erroneous packets in the ingress stream that are marked as erroneous; and
dropping the erroneous packets, or passing the erroneous packets to the neighboring IC unit without processing the erroneous packets based on a configuration specific to the IC unit.

10. The method of claim 5, wherein the error is handled internally by the IC unit without resetting the IC unit.

11. The method of claim 5, wherein marking each of the packets as erroneous includes modifying respective metadata of each packet to indicate that the packet is erroneous.

12. The method of claim 5, wherein the IC unit is one of a plurality of IC units in a processing pipeline of a computing device, and wherein each of the plurality of IC units includes a respective interrupt controller operable to send a corresponding interrupt to an interrupt aggregator of the computing device.

13. The method of claim 12, wherein the interrupt controller in the IC unit sends the corresponding interrupt with a low priority upon detection of the error to prevent the interrupt aggregator from halting operation of the computing device.

14. The method of claim 12, wherein the computing device is a network adapter device operable to transmit or receive network packets via a network.

15. An integrated circuit (IC) unit, comprising:
processing logic circuitry operable to:
process packets received in an ingress stream;
detect that a packet has an error; and
generate an internal error trigger to an interrupt controller to indicate the packet is erroneous;
the interrupt controller operable to:
assert an internal drain indicator to indicate handling of the error internally by the IC unit upon receiving the internal error trigger;
egress packets drain logic circuitry operable to:
mark each of the packets to indicate that the packet is erroneous based on the internal drain indicator; and
drain each of the marked packets by dropping the marked packets or sending the marked packet on an egress stream based on a configuration specific to the IC unit; and
ingress packets blocker circuitry operable to:
block the ingress stream to stop receiving new packets based on the internal drain indicator; and
unblock the ingress stream to receive and process additional packets upon draining of the marked packets.

16. The IC unit of claim 15, further comprising:
packets monitor circuitry operable to:
count the packets internal to the IC unit; and
assert a unit drained indicator when the count of the packets is zero; and
internal drain trigger circuitry operable to:
assert a block indicator to the ingress packets blocker circuitry to block the ingress stream based on the internal drain indicator being asserted;

de-assert the block indicator to the ingress packets blocker circuitry to un-block the ingress stream based on the unit drained indicator being asserted; and generate a packets drain indicator to the egress packets drain logic circuitry to drain the packets based on the internal drain indicator being asserted.

17. The IC unit of claim 16, wherein the packets monitor circuitry is further operable to assert an erroneous packet indicator to indicate erroneous packets in the ingress stream based on metadata of the erroneous packets, wherein the processing logic circuitry is further operable to pass the erroneous packets based on the erroneous packet indicator to the egress packets drain logic circuitry without processing the erroneous packets, and wherein the egress packets drain logic circuitry is further operable to select, based on the configuration, between dropping the erroneous packets, and passing the erroneous packets to a subsequent IC unit in a processing pipeline.

18. The IC unit of claim 15, wherein the IC unit is one of a plurality of IC units in a processing pipeline of a computing device, and wherein each of the plurality of IC units includes a respective interrupt controller operable to send a corresponding interrupt to an interrupt aggregator of the computing device.

19. The IC unit of claim 18, wherein the interrupt controller of the IC unit is further operable to:

send the corresponding interrupt with a low priority upon detection of the error to prevent the interrupt aggregator from halting operation of the computing device.

20. The IC unit of claim 18, wherein the computing device is a network adapter device, and wherein the processing logic circuitry processes the packets by performing encryption on contents of the packets received in the ingress stream for transmission via a network.

* * * * *